Figure 1:
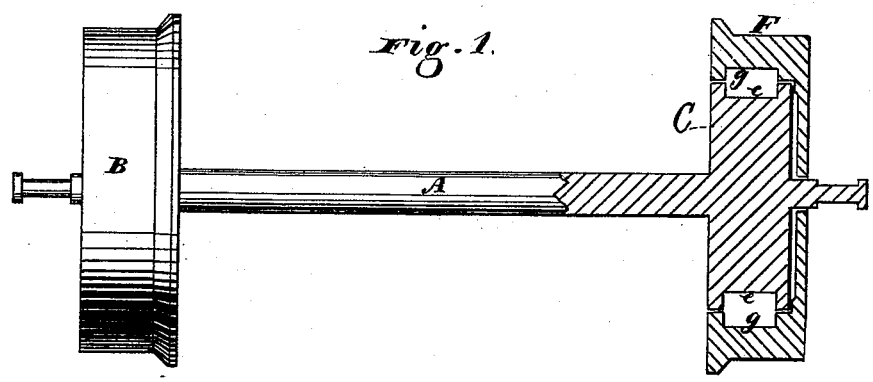

J. W. EMERTON.
CAR-WHEEL.

No. 180,212. Patented July 25, 1876.

Witnesses  Inventor
Geo. H. Strong  John W. Emerton
Jno. L. Borke  by Dewey & Co.
  Attys.

UNITED STATES PATENT OFFICE.

JOHN W. EMERTON, OF SAN FRANCISCO, CALIFORNIA, ASSIGNOR OF ONE-HALF HIS RIGHT TO ANDREW JOHNSON, OF SAME PLACE.

IMPROVEMENT IN CAR-WHEELS.

Specification forming part of Letters Patent No. 180,212, dated July 25, 1876; application filed May 23, 1876.

*To all whom it may concern:*

Be it known that I, JOHN W. EMERTON, of San Francisco city and county, State of California, have invented Improvements in Car Wheels and Axles; and I do hereby declare the following description and accompanying drawings are sufficient to enable any person skilled in the art or science to which it most nearly appertains to make and use my said invention or improvement without further invention or experiment.

My invention relates to an improved car axle and wheel, the improvement consisting in a novel arrangement for providing a loose wheel at one end of the axle, which will rotate independently when a torsion such as results when a car is moving around a curve is applied to the axle, but which will ordinarily, when the car is running on a straight track, rotate with the axle like the fast wheel.

In order to explain my invention so that others will understand its construction and arrangement, reference is had to the accompanying drawings, in which—

Figure 1 is a sectional view of my improved device, the fast wheel being represented by an ordinary side view.

Let A represent an axle, and B the fast wheel upon one end of the axle. Upon the opposite end of the axle I secure a fixed disk, C, which is about half the diameter and half the thickness of an ordinary car-wheel. In the rim of this disk I make a groove, $e$, of any suitable shape, which extends entirely around the circumference of the disk. The loose wheel F, which fits upon this end of the axle, I construct with a concavity on one side, which concavity corresponds in diameter and depth with the diameter and thickness of the disk C, so that when the wheel is slipped upon the axle the disk C will fit snugly in the recess. In the projecting face or rim of the socket I also make a groove, $g$, corresponding with and directly opposite the groove in the rim of the disk, and when the wheel has been properly fitted over the disk, I run the chamber which is formed by the two opposite grooves full of Babbitt or other soft anti-friction metal, so that it will serve as a key to hold the two parts of the wheel together. I then secure the shaft in a vise, and apply power to the wheel to turn it, whereby I free the wheel, so that it will rotate readily about the disk.

It will be noticed that I do not impair the value of the wheel by cutting out its entire center and fitting the disk therein, as has heretofore been done; but my wheel is a complete wheel, with a solid outer face, which prevents sand and dirt from entering between the moving faces of the recess or socket and disk, thereby obviating one of the great difficulties heretofore experienced in this class of loose wheels.

I can also protect the inside joint, if found desirable, by means of a cap; but this will not ordinarily be necessary. But in case the loose wheel should be applied inside of the disk, so that the socket or recess would be on the outside of the wheel, I should then use a cap-ring for covering the joint.

I also retain the strength of the wheel by preserving its center, so that, viewed from the outside, the wheel has all the appearance of a fixed solid wheel.

Having thus described my invention, what I claim, and desire to secure by Letters Patent, is—

The axle A, provided with the fast wheel B on one end and a fast disk, C, which is provided with a groove, $e$, in its rim, on the opposite end, in combination with a car-wheel, F, which is provided with a socket or recess on one side, corresponding with the disk C, and in the rim of which is a groove, $g$, where the said loose wheel and disk are keyed together by means of soft metal run into the grooves between them, substantially as and for the purpose described.

JOHN W. EMERTON. [L. S.]

Witnesses:
CHAS. G. PAGE,
OLWYN T. STACY.